Sept. 3, 1940.  O. G. LAUER  2,213,881

SEPARATOR

Filed April 18, 1938  2 Sheets-Sheet 1

INVENTOR.
Oscar G. Lauer
BY
ATTORNEYS.

Witness:
John S. Braddock

Sept. 3, 1940. O. G. LAUER 2,213,881
SEPARATOR
Filed April 18, 1938 2 Sheets-Sheet 2

INVENTOR.
Oscar G. Lauer
BY
Rice & Rice
ATTORNEYS.

Witness:
John S. Braddock

Patented Sept. 3, 1940

2,213,881

UNITED STATES PATENT OFFICE 2,213,881

SEPARATOR

Oscar G. Lauer, Grand Rapids, Mich., assignor to Grand Rapids Blow Pipe & Dust Arrester Co., Grand Rapids, Mich., a corporation of Michigan Application April 18, 1938, Serial No. 202,588

2 Claims. (Cl. 183—25)

The present invention relates to separators and more particularly to a device for purifying air in an industrial plant.

The primary objects of the instant invention are to provide a device of the general character above indicated having an air intake provided with a water spray head for bathing the air passing therethrough and into the separator; to provide such a device having a water tank supplied with water from the spray head in which tank dust and other foreign matter extracted from the impure air is deposited; to provide such a device whose tank has an overflow pipe whereby floating impurities extracted from the incoming air and settling on the surface of the water within the tank may be carried out through the overflow conduit; to provide such a device having a sludge conveying escalator within the tank for conveyor settled sludge therefrom; to provide such a device having a revolving fan through which the air is drawn for preventing the passage of foreign matter therethrough which has failed to settle within the tank; to provide such a device having a baffled grill whereby the air drawn therethrough is ridded of its water content and possible additional foreign matter; to provide such a device having an apertured head for effecting a substantially uniform diffusion of the air as it is drawn through the separator; and, to provide such a device which is highly utilitarian and efficient in use, relatively simple in construction and economical in manufacture and in operation.

An illustrative embodiment of the invention is shown in the accompanying drawings, wherein.

Figure 1:
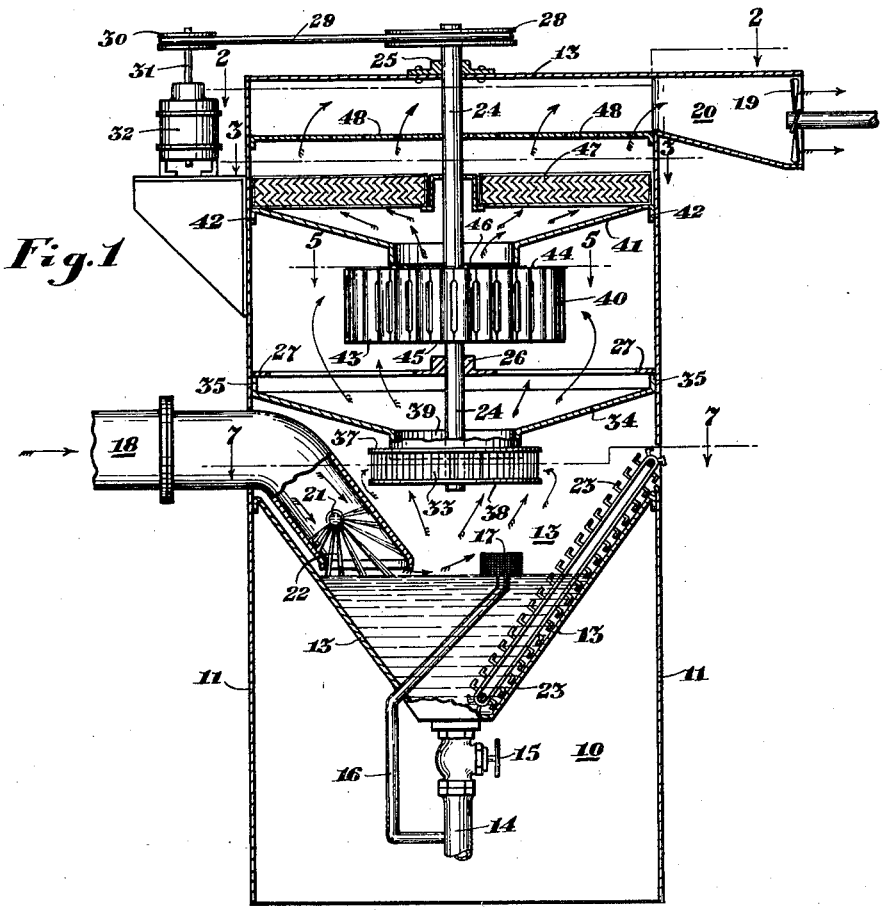
Figure 1 is a central vertical sectional view of the separator.
Figure 2:
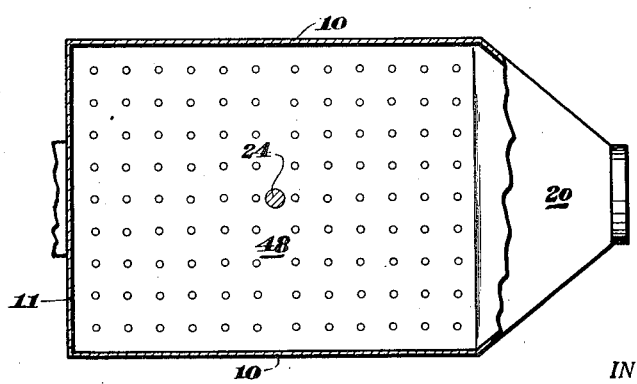
Figure 2 is a sectional view thereof on line 2—2 of Figure 1.
Figure 3:
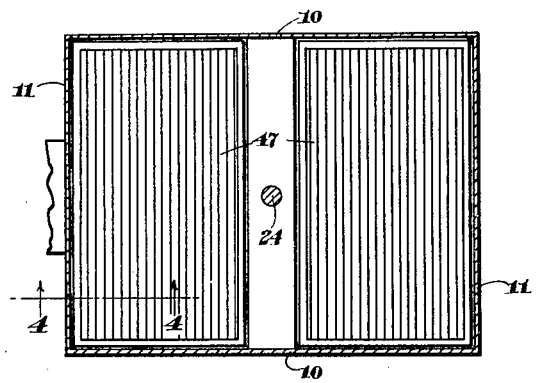
Figure 3 is a sectional view on line 3—3 of Figure 1.

Referring then to the drawings wherein like parts of the separator are all designated by the same numerals in the several views, a housing here shown as generally rectangular in form and having side walls 10, end walls 11 and a top 12 is provided with a water tank whose four walls 13 are disposed angularly downwardly toward each other.

This tank is provided with a drainage conduit 14 having a manually operable valve 15 for controlling the flow of water from the tank through said conduit and it is likewise provided with an overflow conduit 16 for controlling the water level within the tank. The lower end of the overflow conduit communicates with the drainage conduit 14 below the valve 15 and the upper end thereof is here shown as provided with a screen 17 for preventing passage of large foreign matter into the overflow conduit which might result in stoppage and thus impair its efficiency.

An air intake conduit 18 through which the impure air is drawn into the separator by means of a suction fan 19 disposed within the air discharge conduit 20, is disposed above the water level within the tank which is supplied with water by the spray head 21 within the air intake conduit 18 and which air thus drawn into the separator is bathed by the spray 22 from the water spray head.

A sludge conveyor 23 is mounted adjacent one inside end wall of the tank for conveying sludge settling therein out of the tank which conveyor may be power driven as by an electric motor, not shown.

A vertically disposed shaft 24 mounted adjacent its opposite ends within the bearing 25 supported by the top 13 and within the bearing 26 supported by apertured plate 27 is provided at its upper end with a pulley 28 revolved by the belt 29 carried by the pulley 30 on the shaft 31 of an electric motor 32.

Figure 7:
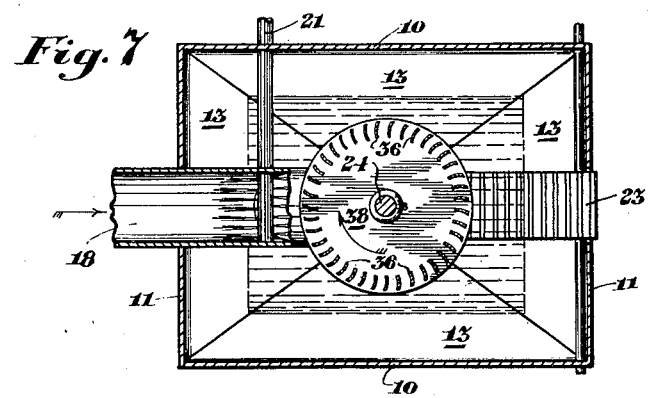
Figure 7 is a sectional view on line 7—7 of Figure 1.

A fan generally designated 33 is fixedly secured and suspended from the lower end of the shaft 24 and below the downwardly angularly disposed partition 34 whose marginal edges 35 are upwardly flanged and secured to the inner surfaces of the side and end walls 10, 11. This fan 33 is provided with a plurality of arcuate blades 36 (Figure 7) axially disposed interjacent a pair of horizontally disposed spaced heads 37, 38 and air drawn between the blades of this fan during rotation of the fan 19 and traveling upwardly through the opening 39 in the partition 34 as is indicated by the arrows is purified and cleansed of foreign matter which has failed to settle within the tank. The current of air through the separator is augmented by the action of fan 33, but the larger particles of impurities are repelled by this fan's blades 36, said particles eventually falling into the water in the tank.

Figure 5:
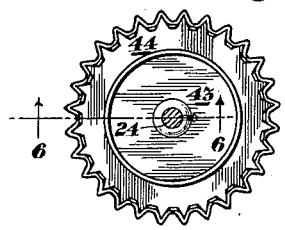
Figure 5 is a top plan view of one of the revolving fans on line 5—5 of Figure 1.
Figure 6:
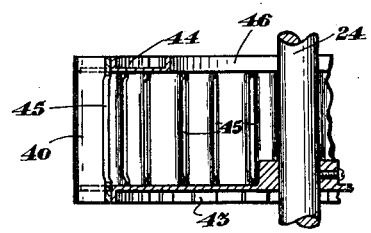
Figure 6 is an enlarged sectional view on line 6—6 of Figure 5.

A second fan generally designated 40 is fixedly secured to the shaft 24 above the plate 27 and below the downwardly angularly disposed partition 41 whose marginal edges 42 are downwardly flanged and secured to the inner surfaces of the side and end walls 10, 11. This fan 40 is in the form of a drum closed at its bottom by the web 43, partially closed at its top by the ring 44 (Figures 5 and 6) and whose convoluted vertical wall is provided with a plurality of spaced axially disposed interstices 45. Air drawn through these interstices during rotation of this fan and travelling upwardly through the opening 46 in the partition 41 as indicated by the arrows is further purified and cleansed, the smaller particles of impurities being repelled by this fan's convoluted vertical wall and by the agitation of the air adjacent thereto.

Figure 4:
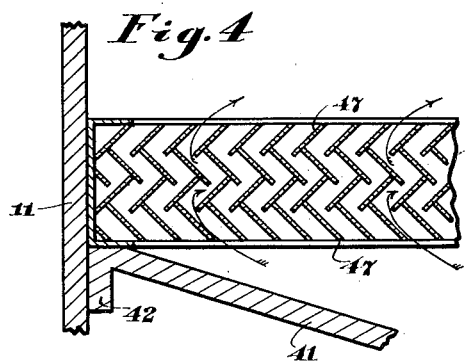
Figure 4 is an enlarged sectional view on line 4—4 of Figure 3.

An air baffling grill 47 having tortuous passages of the character best shown in Figure 4 is disposed above the partition 41 for ridding the air of its water content and of possible additional impurities and an apertured plate 48 is disposed above this baffle and below the top 13 for effecting a substantially uniform diffusion of the air as it is drawn through the separator. A substantially uniform low pressure area is maintained above the apertured plate 48 by the fan 19, and thus upward passage of air is substantially equal through each of the apertures in the plate 48 and is consequently substantially equal through each of the tortuous passages in the grill 47.

In operation, impure air drawn through the air intake conduit 18 into the separator and emitted through the air discharge conduit 20 by means of the suction fan 19 is initially bathed by the spray 21 emitted by the spray head 20. The greater portion of foreign matter carried by the air thus drawn into the separator is caused either to settle on the surface of the water within the tank from which it passes therefrom through the overflow conduit or is caused to settle in the tank below the surface of the water as sludge which is removed by the power operated conveyor.

That foreign matter which fails to settle in the tank is prevented from being emitted through the air discharge conduit by one or both of the revolving fans and the air is thereafter ridded of its water content and possibly additional impurities by the baffled grill.

It will thus be seen that the separator or air purifier herein shown and described is highly utilitarian and efficient in use, relatively simple in construction and economical in manufacture and in operation and while but one specific embodiment of the invention has been herein shown and described, it will be understood that certain details of the construction shown may be altered or omitted without departing from the spirit of this invention as the same is defined by the following claims.

I claim:

1. A separator comprising a housing, a water tank within the housing, an air intake conduit leading into the housing and having its inner end disposed in a downward direction for effecting direct impingement of the intaken air against the surface of the water in the tank, an air discharge conduit, means for inducing a flow of air through the separator, a water spray head within the air intake conduit for bathing the air drawn therethrough and for supplying the tank with water, said spray head being so arranged that water therefrom is directed downwardly into the water in the tank for collecting foreign matter from the air and forcibly propelling said matter into the water in the tank, a rotatably mounted fan disposed above the water level in the tank whose blades are so disposed that air travelling through the separator is caused to travel between said blades and the impurities in said air are repelled by said blades, and a baffle disposed above the water level in the tank through which the air is caused to flow during its travel through the separator.

2. A separator comprising a housing, a water tank within the housing, an air intake conduit leading into the housing and having its inner end disposed in a downward direction for effecting direct impingement of the intaken air against the surface of the water in the tank, an air discharge conduit, means for inducing a flow of air through the separator, a water spray head within the air intake conduit for bathing the air drawn therethrough and for supplying the tank with water, said spray head being so arranged that water therefrom is directed downwardly into the water in the tank for collecting foreign matter from the air and forcibly propelling said matter into the water in the tank, a baffle disposed above the water level in the tank through which the air is caused to flow during its travel through the separator, and an apertured plate disposed above the baffle for effecting a substantially diffused flow of air through the baffle.

OSCAR G. LAUER.